US010527852B2

(12) United States Patent
Karvonen et al.

(10) Patent No.: US 10,527,852 B2
(45) Date of Patent: Jan. 7, 2020

(54) DIFFRACTIVE FILTERING IN A WAVEGUIDE DISPLAY

(71) Applicant: Microsoft Technology Licensing, LLC, Redmond, WA (US)

(72) Inventors: Lasse Pekka Karvonen, Espoo (FI); Andreas Langner, Espoo (FI)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 15/604,563

(22) Filed: May 24, 2017

(65) Prior Publication Data
US 2018/0341111 A1    Nov. 29, 2018

(51) Int. Cl.
*G02B 27/01*    (2006.01)
*F21V 8/00*    (2006.01)

(52) U.S. Cl.
CPC ......... *G02B 27/0172* (2013.01); *G02B 6/003* (2013.01); *G02B 6/0016* (2013.01); *G02B 6/0076* (2013.01); *G02B 2027/0112* (2013.01); *G02B 2027/0125* (2013.01)

(58) Field of Classification Search
CPC .................................................. G02B 27/0172
See application file for complete search history.

(56) References Cited

U.S. PATENT DOCUMENTS

| 8,331,006 | B2 | 12/2012 | Levola |
| 2003/0210467 | A1 | 11/2003 | Song |
| 2004/0004217 | A1* | 1/2004 | Jayaraman ............... H01S 5/12 257/53 |
| 2005/0135008 | A1 | 6/2005 | Challener et al. |
| 2010/0034071 | A1 | 2/2010 | Ohnishi |
| 2010/0079865 | A1 | 4/2010 | Saarikko et al. |
| 2011/0242661 | A1 | 10/2011 | Simmonds |
| 2013/0314793 | A1 | 11/2013 | Robbins et al. |

(Continued)

FOREIGN PATENT DOCUMENTS

CN    104777535 A    7/2015

OTHER PUBLICATIONS

Mukawa, et al., "A full color eyewear display using planar waveguide with reflection volume holograms", In Journal of the society for information display, vol. 17, Issue 3, Mar. 2009, pp. 185-193.

(Continued)

*Primary Examiner* — Sung H Pak
*Assistant Examiner* — Hoang Q Tran
(74) *Attorney, Agent, or Firm* — Alleman Hall Creasman & Tuttle LLP (57) ABSTRACT

Examples are disclosed that relate to the use of diffractive filtering in a waveguide display system. One example provides a display system including a light source, a first waveguide configured to conduct light of a first wavelength band from the light source, the first waveguide comprising a first input coupler, a second waveguide configured to conduct light of a second wavelength band from the light source, the second waveguide comprising a second input coupler, and a diffractive filter positioned optically between the first waveguide and the second waveguide, the diffractive filter being configured to diffract light of the first wavelength band and transmit light of the second wavelength band.

16 Claims, 9 Drawing Sheets

(56) References Cited

U.S. PATENT DOCUMENTS

| | | | |
|---|---|---|---|
| 2014/0064655 A1* | 3/2014 | Nguyen | G02B 6/0076 |
| | | | 385/11 |
| 2014/0140653 A1 | 5/2014 | Brown et al. | |
| 2015/0002528 A1* | 1/2015 | Bohn | G02B 27/0172 |
| | | | 345/589 |
| 2015/0042850 A1 | 2/2015 | Bilcu et al. | |

OTHER PUBLICATIONS

Kress, et al., "Diffractive and Holographic Optics as Optical Combiners in Head Mounted Displays", In Proceedings of the ACM conference on Pervasive and ubiquitous computing adjunct publication, Sep. 8, 2013, pp. 1479-1482.

* cited by examiner

DIFFRACTIVE FILTERING IN A WAVEGUIDE DISPLAY

BACKGROUND

An optical display system may utilize one or more waveguides to deliver images to a user's eye for viewing. In some display devices, different waveguides may be used to deliver different color subframes of an image.

SUMMARY

Examples are disclosed that relate to the use of diffractive filtering in a waveguide display system. One example provides a display system including a light source, a first waveguide configured to conduct light of a first wavelength band from the light source, the first waveguide comprising a first input coupler, a second waveguide configured to conduct light of a second wavelength band from the light source, the second waveguide comprising a second input coupler, and a diffractive filter positioned optically between the first waveguide and the second waveguide, the diffractive filter being configured to diffract light of the first wavelength band and transmit light of the second wavelength band.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

An augmented reality display device may be configured to present virtual imagery via a waveguide positioned in front of a user's field of view, such that images delivered by the waveguide are superimposed over a real-world background viewable through the waveguide. In such a device, a color image may be displayed by forming subframes for each color of light, and delivering each subframe to the viewer via a separate waveguide. The subframes are superimposed from a perspective of a user, thereby forming a color virtual image.

Different types of input and output couplers may be used to couple light respectively into and out of a waveguide, such as diffractive optical elements. Where different waveguides are used to conduct different colors of light, an input coupler for a waveguide may be configured to couple a specific wavelength band of light into the waveguide and transmit other wavelengths through the waveguide without coupling in the other wavelengths. However, in some instances, some light within the specific wavelength band may be transmitted through an input coupler, instead of being coupled into a waveguide. Further, in some instances, some light having wavelengths outside of the specific wavelength band may be coupled into the waveguide. Thus, where different waveguides are used to deliver different colors in an image to a user, it is possible for undesired color bands to be coupled into a waveguide along with light of the desired band. This may result in nonuniformities (e.g. color and/or angular nonuniformities) in the displayed image.

Figure 1:
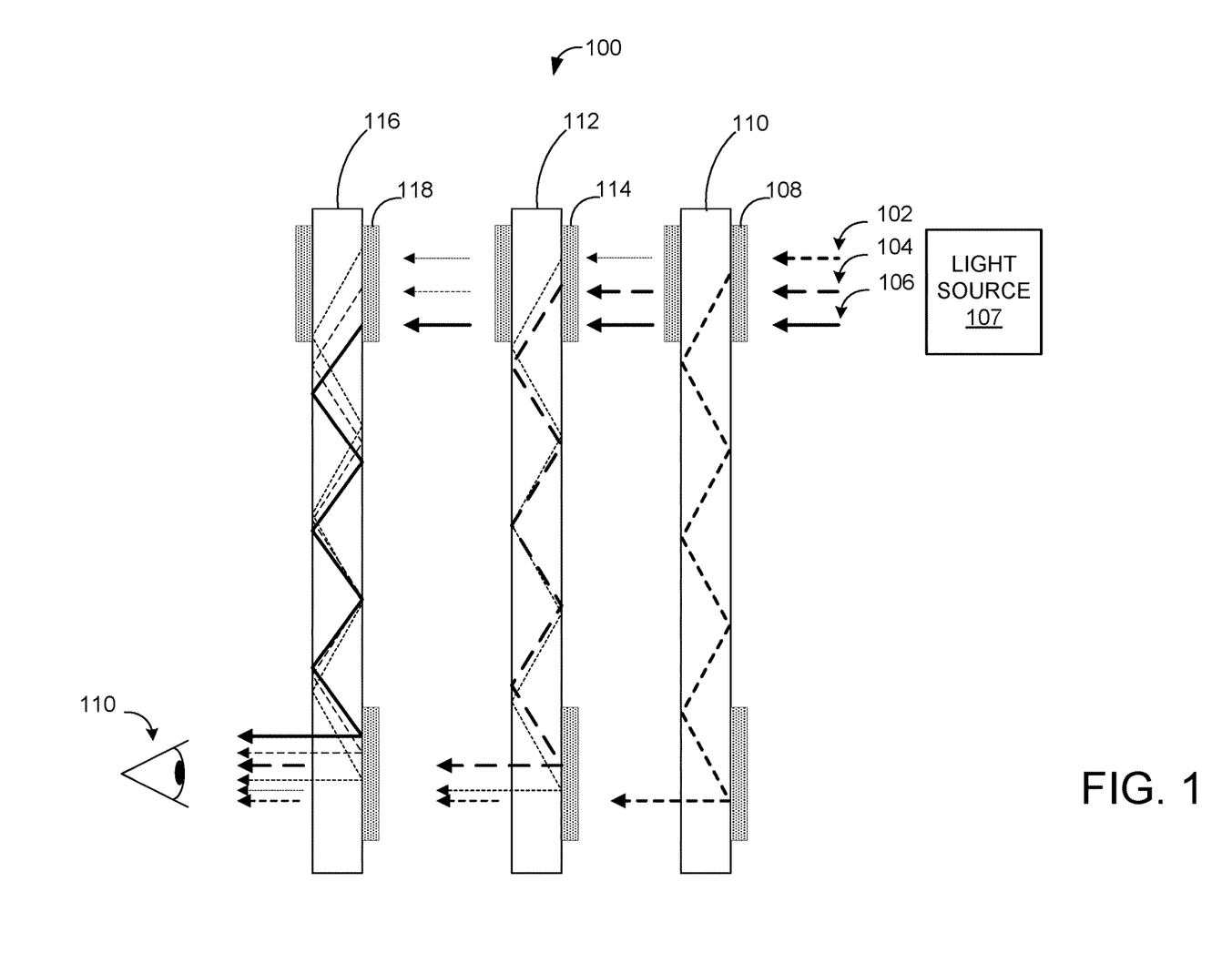
FIG. 1 shows an example of the generation of image nonuniformities in a waveguide display system.

FIG. 1 shows an example of the generation of image nonuniformities in a waveguide display system. In this example, light comprising three wavelength bands 102, 104, and 106 (illustrated via rays having different line patterns) is directed from a light source 107 to an input coupler 108 for a first waveguide 110. The term "light source" as used herein may represent any suitable optics upstream of a waveguide system. Examples include, but are not limited to, one or more lasers or LEDs (light emitting diodes), one or more light-modulating display panels (e.g. a liquid crystal display (LCD)), one or more organic light emitting devices or other light-emitting panels, one or more scanning mirror systems, relay optics, and combinations thereof. A substantial portion of light within wavelength band 102 is coupled into the waveguide 110 through the input coupler 108, while wavelength bands 104 and 106 are transmitted through the input coupler 108. However, as described above, some light within wavelength band 102 may not be coupled into the first waveguide 110, but instead may be transmitted through. The light within wavelength band 102 then may be coupled into a second waveguide 112 via an input coupler 114 for the second waveguide 112, along with light within wavelength band 104, thereby causing nonuniformities in the displayed image. Additionally, some light within wavelength band 104 and some remaining light from wavelength band 102 may be coupled into a third waveguide 116 via an input coupler 118 for the third waveguide 116, along light from wavelength band 106. This may further contribute to nonuniformities in a displayed image.

Various approaches may be taken to try to address such issues in a waveguide display system. For example, color filters, absorptive or reflective, may be placed between the waveguides. However, such filters may pose problems. For example, dye-based absorptive filters may photodegrade over time, while pigment-based absorptive filters may cause relatively higher optical losses, and thus result in greater power consumption due to the need to use a higher intensity light source.

Figure 2:
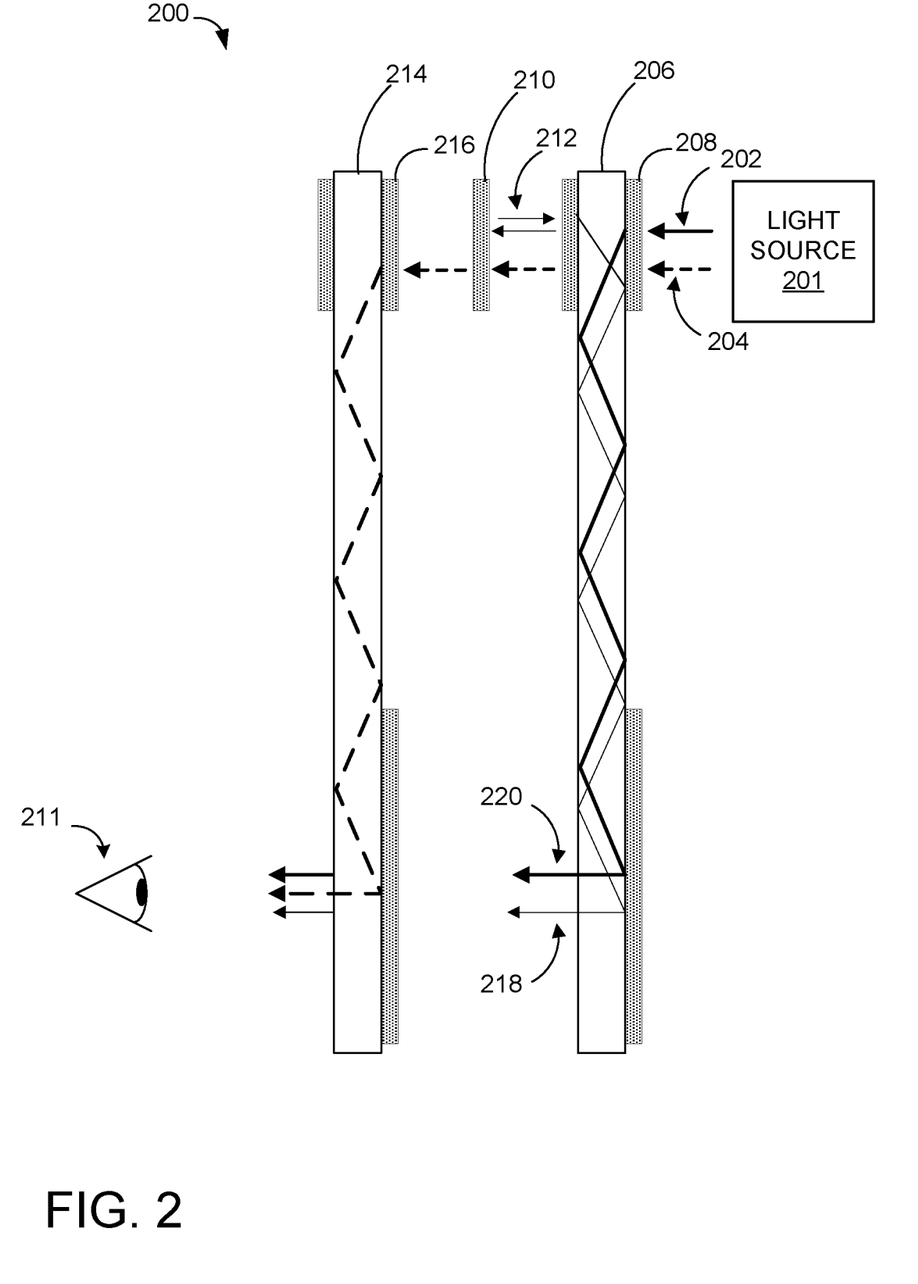
FIG. 2 shows an example of the generation of ghost images in a waveguide display system that utilizes a reflective filter.

Wavelength-selective reflective filters may be more robust and more efficient than absorptive filters. However, light reflected by a reflective filter may travel back through the optical system generating multiple optical paths, which may create one or more ghost images. FIG. 2 schematically shows an example of a display system 200 employing a reflective filter, and illustrates the path of light of a first wavelength band 202 and a second wavelength band 204 through the system. In this example, light from a light source 201 within the first wavelength band 202 is coupled into waveguide 206 via input coupler 208, while light within the second wavelength band 204 is transmitted through input coupler 208. However, some light within the first wavelength band 202 also is transmitted through waveguide 206 without being coupled into waveguide 206.

Figure 3:
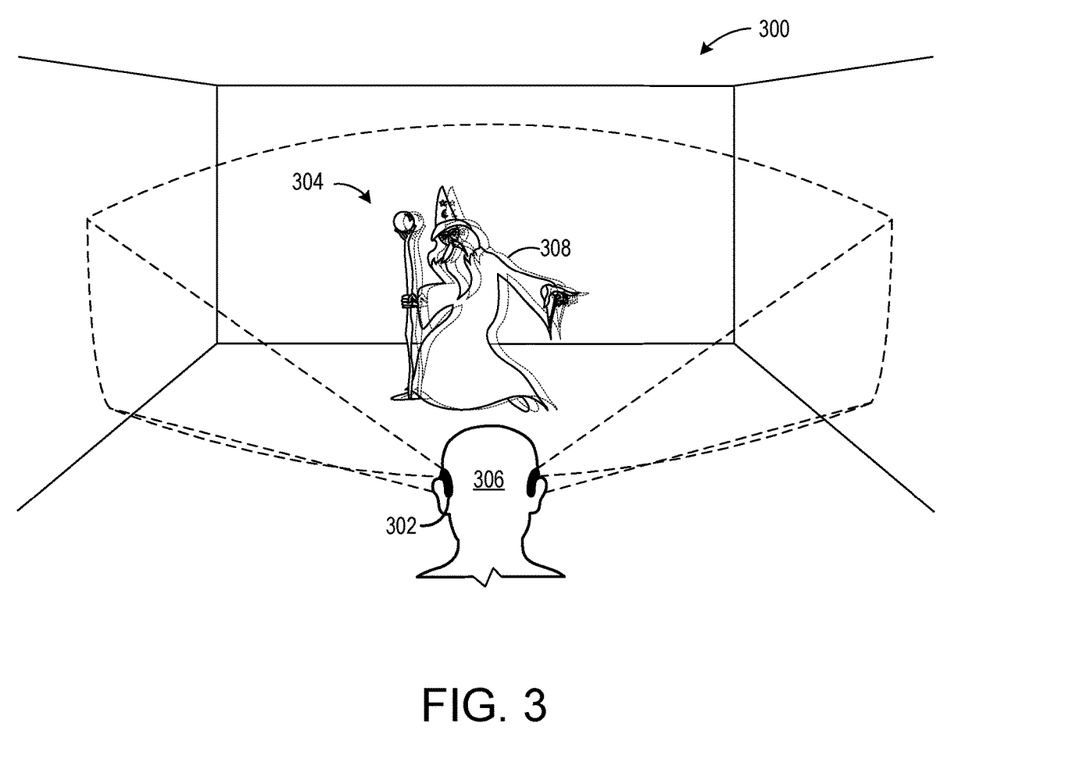
FIG. 3 shows an example ghost image generated by a waveguide display system.

Light that is transmitted through the first waveguide 206 without being coupled into the first waveguide 206 next encounters a reflective filter 210. Light within the second wavelength band 204 passes through the reflective filter toward the input coupler 216 for a second waveguide 214. On the other hand, light within the first wavelength band 202 is reflected, as indicated at 212, and may be coupled into the first waveguide 206 to propagate along a path 218 that is offset from a path 220 of light coupled into the first waveguide 206 directly from the light source. The offset light thus may appear as a ghost image. FIG. 3 shows an example near-eye display device 302 displaying a virtual object 304 to a user 306, and illustrates a ghost image 308 of the virtual object 304 that is also visible to the user 306.

Accordingly, examples are disclosed herein that relate to using diffractive filtering to limit out-of-band wavelengths being coupled into wavelength-band-specific waveguides. The use of diffractive filtering may achieve a desired degree of wavelength selectivity while potentially avoiding the issues described above regarding absorptive and reflective filtering.

Figure 4:
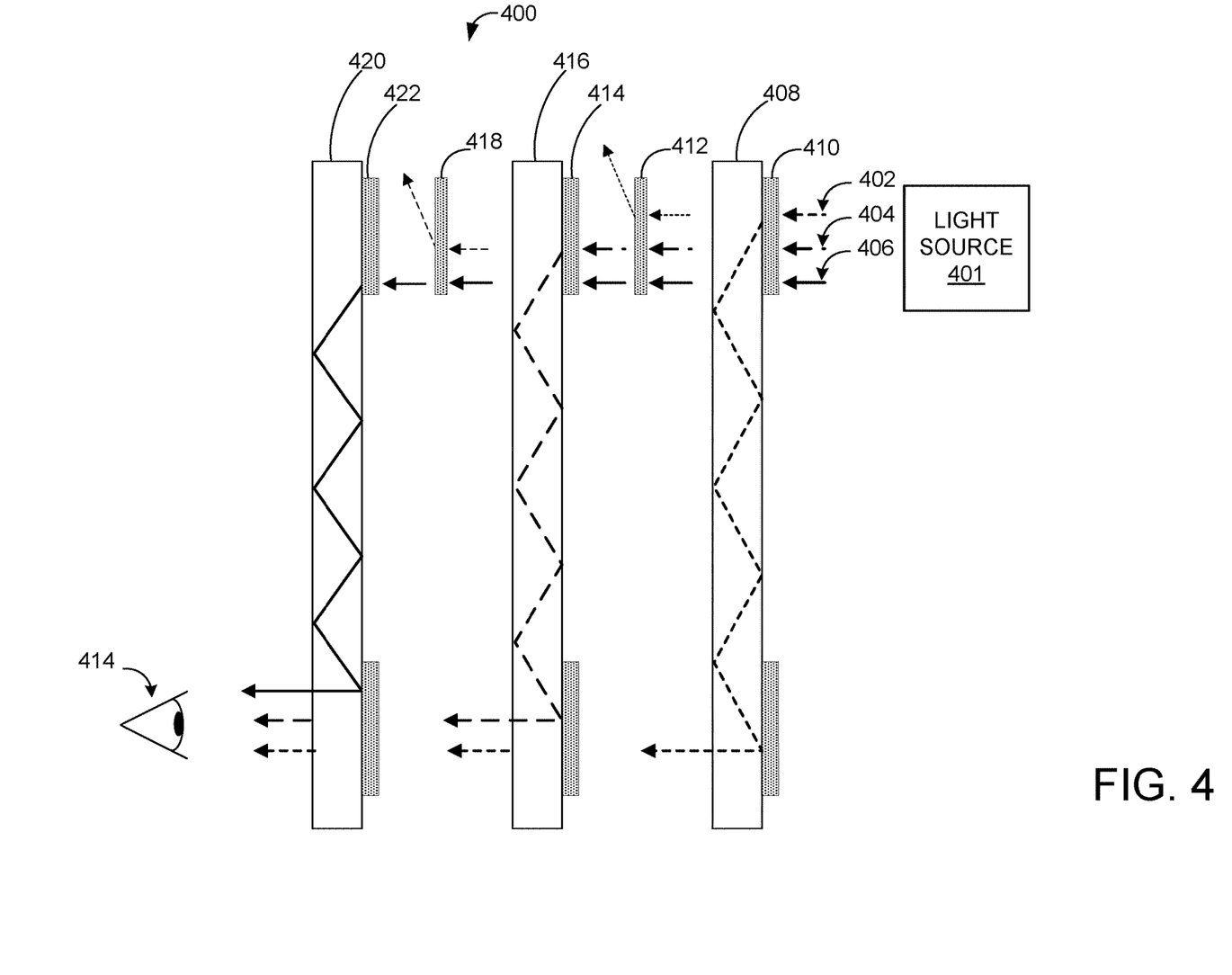
FIG. 4 shows an example optical system configured to diffractively filter light at an input side of a waveguide arrangement.

FIG. 4 schematically shows an example of a waveguide display system 400 that utilizes diffractive filtering at an input side of a waveguide arrangement to avoid image nonuniformities. Waveguide display system 400 comprises a light source 401 that outputs light comprising three wavelength bands 402, 404, and 406. Waveguide display system also includes respective waveguides for each wavelength band. A substantial portion of light within wavelength band 402 (e.g. about 30% in some examples) is coupled into a first waveguide 408 via an input coupler 410 for the first waveguide, while wavelength bands 404 and 406 are transmitted through the input coupler 408. As described above, some light within wavelength band 402 also is transmitted through the first waveguide 408. This light, along with light within wavelength bands 404 and 406, passes to a first diffractive filter 412 configured to diffract light within wavelength band 402 away from an input coupling condition of an input coupler 414 for a second waveguide 416, e.g. by changing the angle of the light within wavelength band 402 sufficiently to avoid being coupled into the second waveguide.

A second diffractive filter 418 similarly may be used between the second waveguide 416 and a third waveguide 420. For example, as shown in FIG. 4, some light within wavelength band 404 may be transmitted through the second waveguide 416, along with wavelength band 406. Thus, the second diffractive filter 418 may be used to diffract such light from wavelength band 404 away from an input coupling condition of input coupler 422 for the third waveguide 420. Thus, use of the first diffractive filter 412 and the second diffractive filter 418 may help to avoid nonuniformities in a displayed image by preventing out-of-band light from being coupled into waveguides intended for specific wavelength bands.

Figure 5:
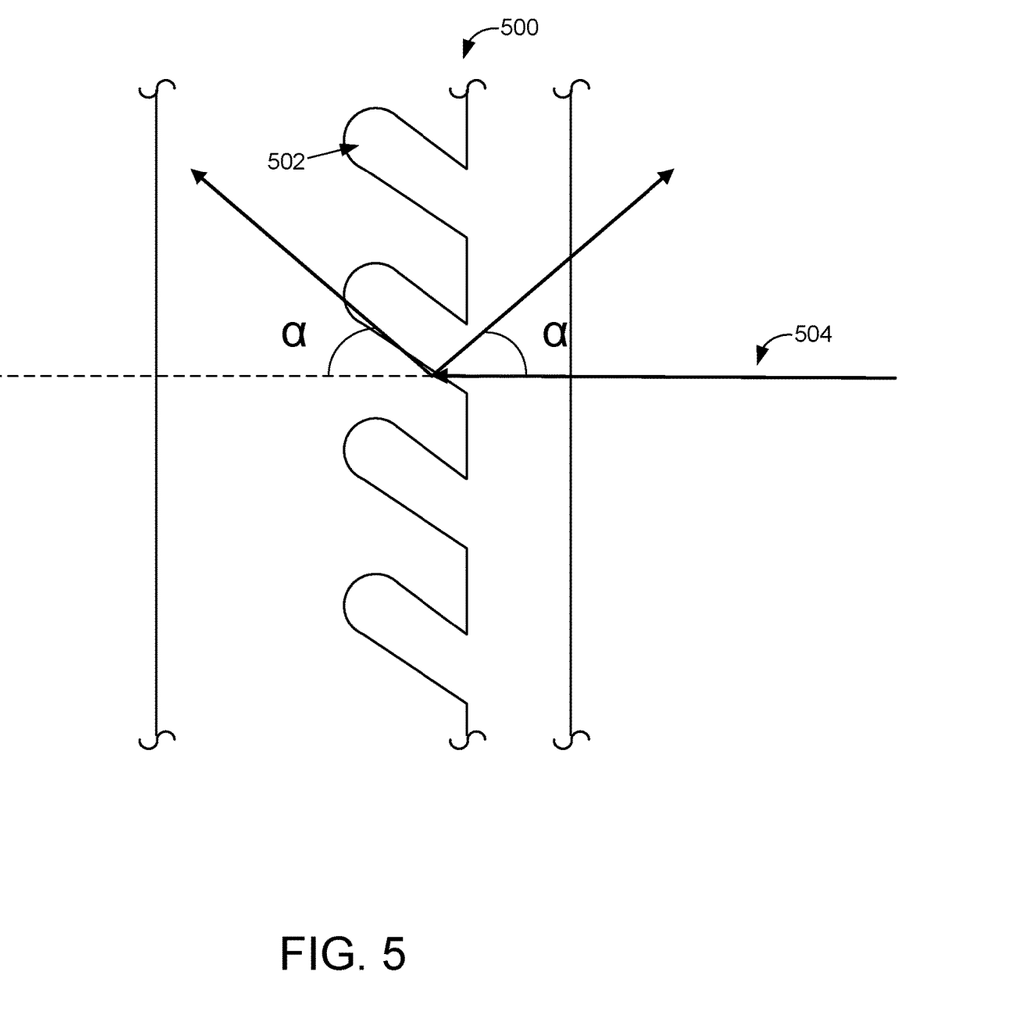
FIG. 5 shows a schematic depiction of an example diffractive filter.

The first diffractive filter 412 and the second diffractive filter 418 may have any suitable configurations. In some examples, each diffractive filter may take the form of a slanted grating configured to diffract the desired wavelength band(s) sufficiently to avoid being coupled into a waveguide intended for a different wavelength band. FIG. 5 shows an example grating 500 comprising a plurality of grating features 502 having a grating period (spacing) configured to diffract out-of-band wavelengths of received light at an angle α outside of the input coupling condition for a waveguide intended for a different wavelength band. The grating features are arranged in a slanted orientation in FIG. 5 relative to a direction of incoming light 504, but may have any other suitable arrangement. Grating features arranged in a slanted orientation relative to a direction of incoming light may provide higher light diffracting efficiency in a desired direction as compared to non-slanted grating features. In one specific example, referring again to FIG. 4, wavelength band 402 comprises blue light, wavelength band 404 comprises green light, and wavelength band 406 comprises red light. In such an example, the first diffractive filter 412 may be configured to diffract blue and transmit green and red light, and may have a grating period of approximately 246 nanometers. Further, second diffractive filter 418 may be configured to diffract green and transmit red, and may have a grating period of approximately 281 nanometers, and a slant angle relative to an incoming light ray of approximately 20-45 degrees. Such a grating may diffract out of band light at an angle of approximately 30 degrees or greater, which may help to avoid the light being coupled into a waveguide for a different wavelength band. Zeroth order diffraction may be reduced, for example, by consideration of grating parameters such as fill factor, slant and depth. In other examples, any other suitable diffractive filters having any other suitable grating parameters (e.g. fill factor, depth, and slant) may be used. Further, while the waveguides in this example are arranged in a blue-green-red order (starting from closest to the light source), in other examples the waveguides may be positioned in any suitable order.

The diffraction grating 500 may be formed in any suitable manner. In one example, a master process may be used in which a master grating is first formed via lithography (e.g. interference/e-beam lithography) and dry etching (e.g. reactive ion-beam etching). The master grating then may be replicated in a higher volume process by nanoimprinting with a suitable resin material. In other examples, any other suitable type of grating may be used. Examples include non-slanted gratings, blazed gratings, and 2- and 3-dimensional gratings.

Figure 6:
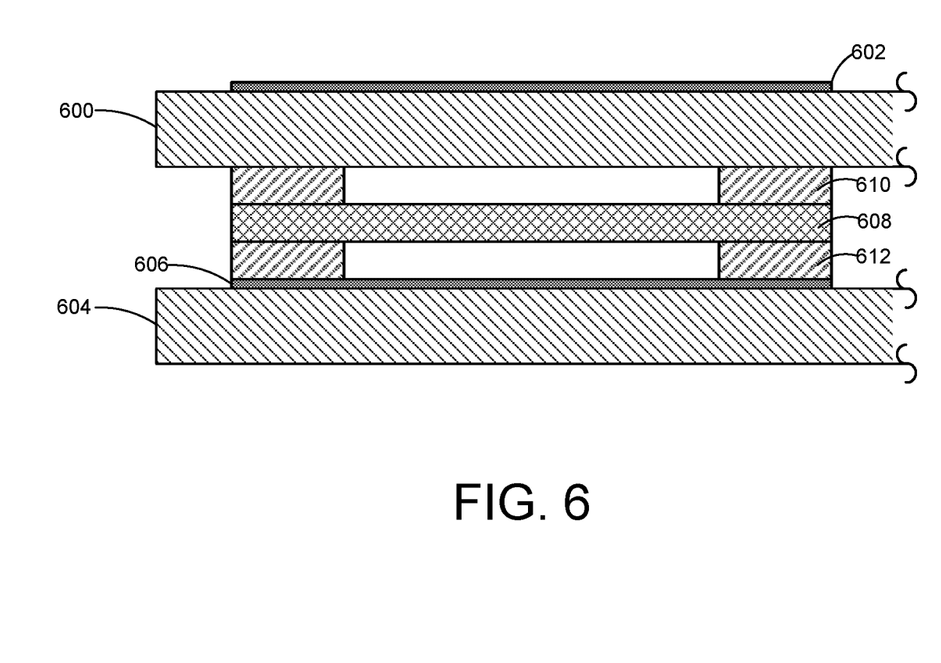
FIG. 6 shows a schematic depiction of an example diffractive filter coupled to an adjacent waveguide via one or more spacers.
Figure 7:
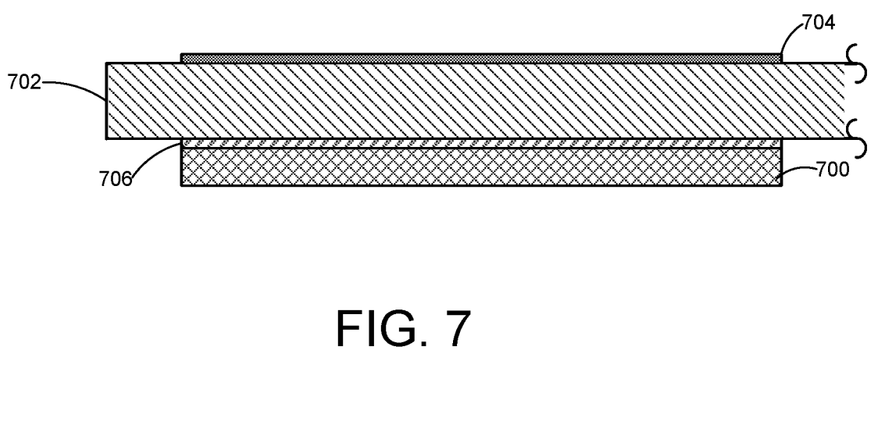
FIG. 7 shows a schematic depiction of an example diffractive filter coupled to an adjacent waveguide via an adhesive.

Referring again to FIG. 4, the first diffractive filter 412 and the second diffractive filter 418 may have any suitable spatial relationship to the waveguides. In some examples, the first diffractive filter 412 is located physically between the first waveguide 408 and the second waveguide and is spaced from the waveguides, for example, via spacers that maintain a desired separation between the first diffractive filter 412 and the first and second waveguides 408, 416. FIG. 6 shows an example of such a configuration. The depicted example comprises a first waveguide 600, an input coupler 602 for the first waveguide 600, a second waveguide 604, and an input coupler 606 for the second waveguide 604. Further, a diffractive filter 608 is disposed between the first waveguide 600 and the second waveguide 604, and is spaced from each respectively by spacers 610 and 612. In other examples, spacers may be located on only one side of the diffractive filter. In yet other examples, a diffractive filter may be in physical contact with a waveguide or both waveguides. For example, the first diffractive filter may be bonded to either or both waveguides with an adhesive having suitable optical properties. FIG. 7 schematically shows an example including a diffractive filter 700 adhered to an exit surface of a waveguide 702 (e.g. an opposite face of the waveguide from a light source and input coupler 704) via an adhesive 706. In such an example, a second waveguide (not shown) may be adhered to an opposite side of the diffractive filter as waveguide 702. In yet other examples, a diffractive filter may be integrated with a waveguide, e.g. as a surface relief grating formed on a surface of a waveguide.

Figure 8:
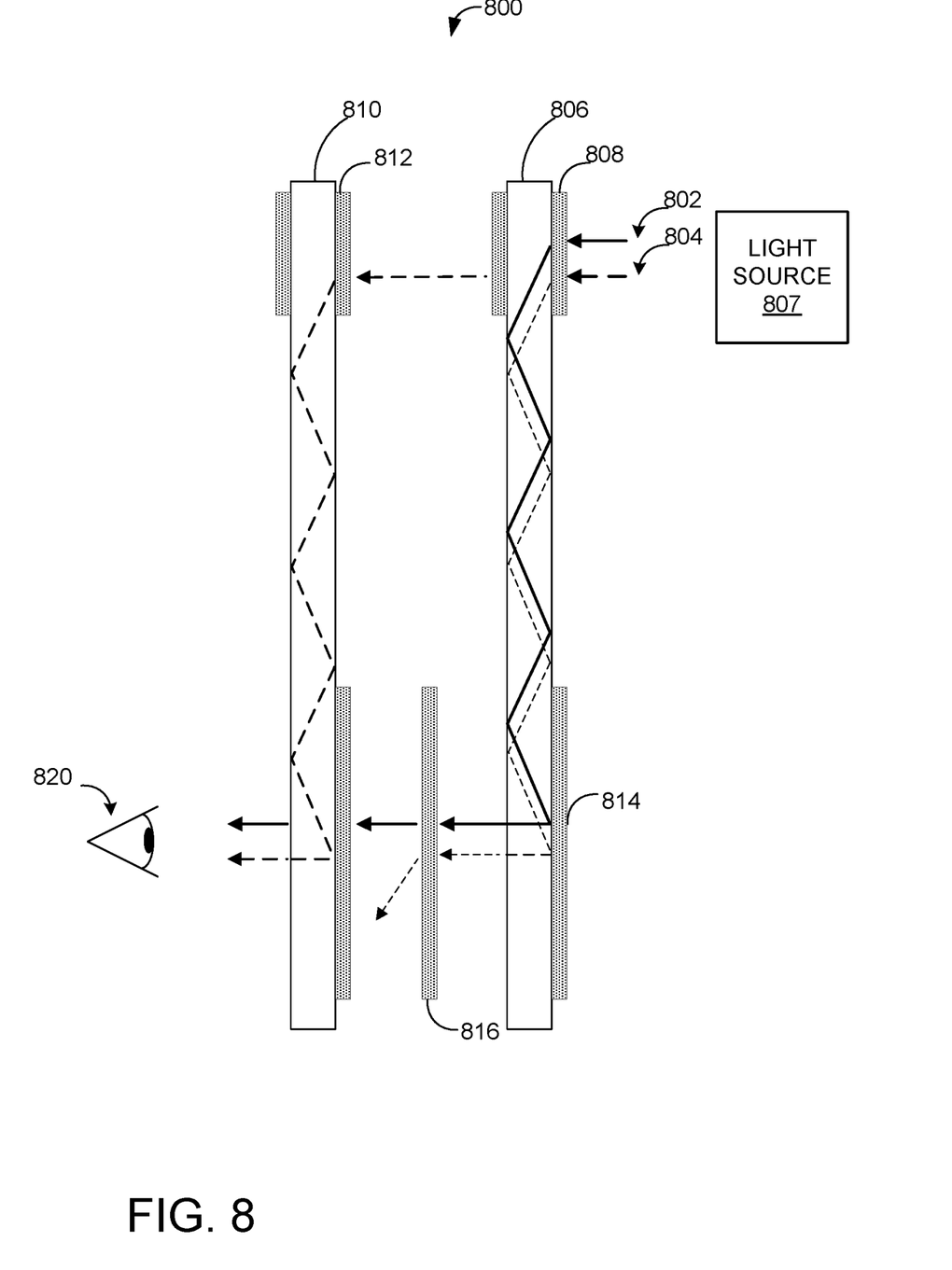
FIG. 8 shows an example optical system configured to diffractively filter light at an output side of a waveguide arrangement.

FIG. 8 schematically shows an example of a waveguide display system 800 that utilizes diffractive filtering at an output side of a waveguide arrangement to avoid image nonuniformities. In contrast with the example of FIG. 4, the waveguide display system 800 utilizes diffractive filtering optically downstream of an output coupler for a waveguide to remove out-of-band light that is output from band-specific waveguides. In the depicted example, light within a first wavelength band 802 and a second wavelength band 804 is received at a first waveguide 806. The first waveguide 806 is configured to couple in light within the first wavelength band 802 via a first waveguide input coupler 808.

However, some light within the second wavelength band 804, which is out-of-band with respect to the first waveguide 806, is also coupled into the first waveguide 806. This light then propagates through the first waveguide to an output coupler 814 of the first waveguide 806, where at least some of the light within the second wavelength band is coupled out of from the waveguide, along with light in the first wavelength band.

Thus, to prevent the appearance of nonuniformities in the image, a diffractive filter 816 is positioned between the output coupler 814 of the first waveguide and an output of the optical system. The diffractive filter 816 is configured to diffract light within wavelength band 804 at a sufficient angle away from that the light does not reach the eye 820 of a user. This may help to avoid any ghosting or other nonuniformities resulting from light within the second wavelength band 804 reaching the viewer's eye 820 via both the first waveguide 806 and the second waveguide 810. While the display system 800 of FIG. 8 includes two waveguides and one diffractive filter, other examples may include any suitable number and arrangement of waveguides and diffractive filters. Further, in some examples, diffractive filters may be located both at input and output sides of a waveguide arrangement, and as such may include aspects both of display system 400 and display system 800.

Figure 9:
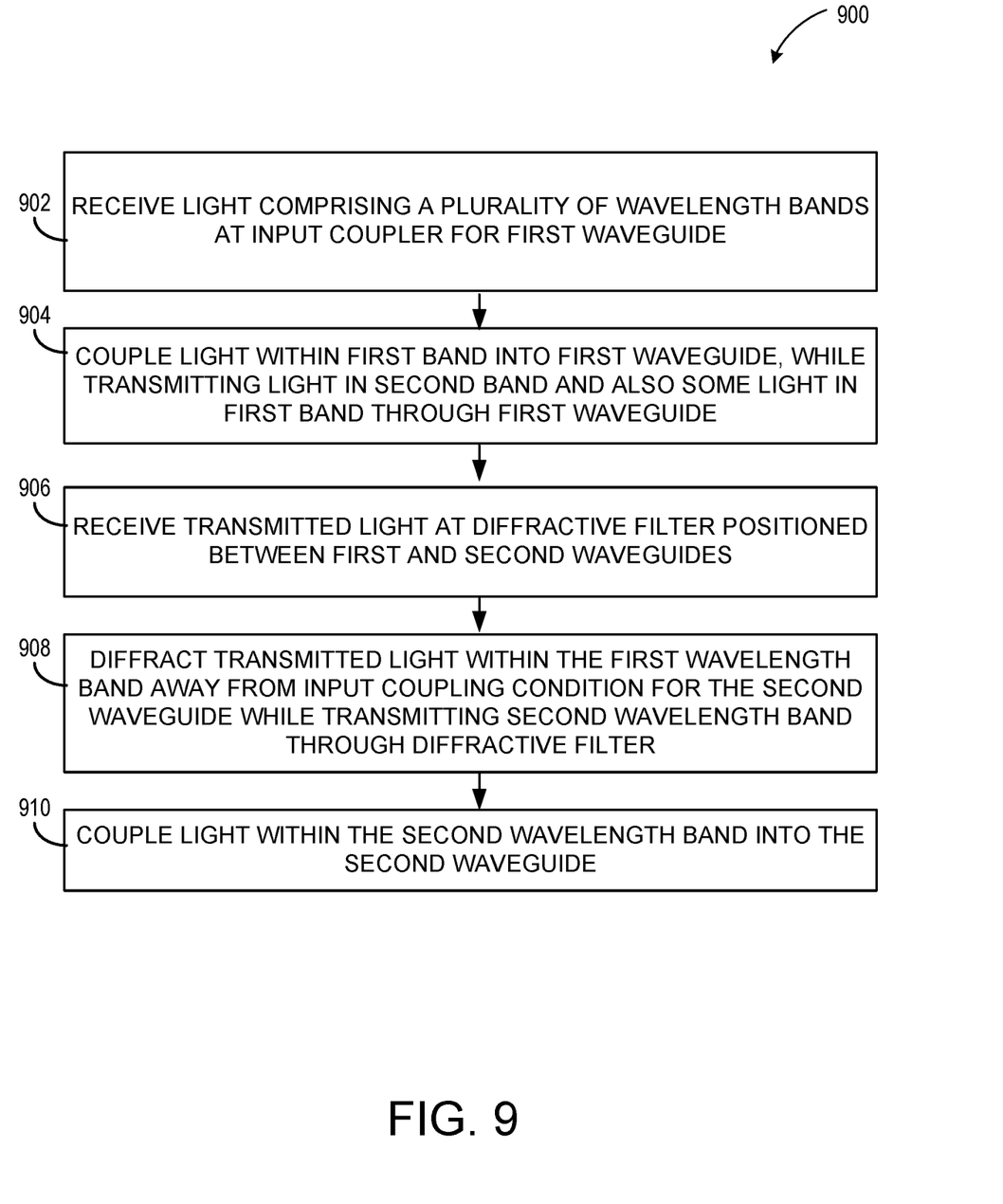
FIG. 9 shows a flow diagram illustrating an example method diffractively filtering light in a waveguide display.

FIG. 9 shows an example method 900 for avoiding optical nonuniformities in a waveguide display system via diffractive filtering. Method 900 includes, at 902, receiving light from a light source. As described above, the received light comprises a plurality of wavelength bands. In some examples, the light may include three wavelength bands, such as a red band, a green band, and a blue band, for the display of color images Method 900 further comprises, at 904, coupling light within a first wavelength band into the first waveguide, while transmitting uncoupled light through the first waveguide. The uncoupled light includes light a second wavelength band, some light within the first wavelength band that was not coupled into the first waveguide, and possibly other wavelength bands. Method 900 further includes, at 906, receiving this transmitted light at a diffractive filter positioned optically between the first waveguide and a second waveguide, and at 908, diffracting light within the first wavelength band away from an input coupling condition for the second waveguide while transmitting light within a second wavelength band through the diffractive filter. The light from the second wavelength band is then coupled into the second waveguide, as indicated at 910. In this manner, at least a portion of the light from the first wavelength band that was not coupled into the first waveguide is prevented from coupling into the second waveguide. It will be understood that similar structures and processes may be used to prevent light within the second wavelength band from being coupled into a third waveguide. Likewise, similar structures and processes may be used at an output side of a waveguide arrangement to avoid out-of-band light output from a waveguide from reaching the eye of a viewer.

Another example provides a display system comprising a light source, a first waveguide configured to conduct light of a first wavelength band from the light source, the first waveguide comprising a first input coupler, a second waveguide configured to conduct light of a second wavelength band from the light source, the second waveguide comprising a second input coupler, and a diffractive filter positioned optically between the first waveguide and the second waveguide, the diffractive filter being configured to diffract light of the first wavelength band and transmit light of the second wavelength band. The diffractive filter may additionally or alternatively be located between the first input coupler and the second input coupler. The diffractive filter may additionally or alternatively be located between an output coupler of the first waveguide and the second waveguide. The diffractive filter may additionally or alternatively comprise a slanted grating. The diffractive filter may additionally or alternatively have a grating period configured to diffract blue light and transmit green light. The diffractive filter may additionally or alternatively have a grating period configured to diffract green light and transmit red light. The display system may additionally or alternatively comprise an augmented reality head mounted display. The diffractive filter may additionally or alternatively be spaced from one or more of the first waveguide and the second waveguide. The diffractive filter may additionally or alternatively be coupled to one or more of the first waveguide and the second waveguide via an adhesive. The first diffractive filter may additionally or alternatively be integrated with one or more of the first waveguide and the second waveguide.

Another example provides a display system, comprising a light source, a first waveguide configured to conduct light of a first wavelength band from the light source, the first waveguide comprising a first input coupler, a second waveguide configured to conduct light of a second wavelength band from the light source, the second waveguide comprising a second input coupler, a third waveguide configured to conduct light of a third wavelength band from the light source, the third waveguide comprising a third input coupler, a first diffractive filter positioned between the first waveguide and the second waveguide, the first diffractive filter configured to diffract light of the first wavelength band away from an input coupling condition for the second input coupler, and a second diffractive filter positioned between the second waveguide and the third waveguide, the second diffractive filter configured to diffract light of the second wavelength band away from an input coupling condition for the third input coupler. One or more of the first diffractive filter and the second diffractive filter may additionally or alternatively comprise a slanted grating. The first diffractive filter may additionally or alternatively be configured to transmit green light and diffract blue light. The second diffractive filter may additionally or alternatively be configured to transmit red light and diffract green light. The display system may additionally or alternatively comprise an augmented reality head mounted display. The first diffractive filter may additionally or alternatively be located between the first waveguide and an input of the second waveguide, and the second diffractive filter may additionally or alternatively be located between the second waveguide and an input of the third waveguide. The first diffractive filter may additionally or alternatively be located between an output coupler of the first waveguide and the second waveguide. The first diffractive filter may additionally or alternatively be spaced from one or more of the first waveguide and the second waveguide. The first diffractive filter may additionally or alternatively be coupled to the one or more of the first waveguide and the second waveguide via an adhesive.

Another example provides, in a display system, a method comprising receiving light from a light source at an input coupler for a first waveguide, coupling light within a first wavelength band into the first waveguide while transmitting at least some uncoupled light within the first wavelength band through the first waveguide, receiving the uncoupled light within the first wavelength band at a diffractive filter positioned optically between the first waveguide and an input coupler for a second waveguide, diffracting at least a portion of the uncoupled light within the first wavelength band away from an input coupling condition for the second waveguide while transmitting light within a second wavelength band through the diffractive filter, and coupling light within the second wavelength band into the second waveguide.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A display system comprising:
a light source;
a first waveguide configured to conduct light of a first wavelength band from the light source, the first waveguide comprising a first input coupler configured to couple the light of the first wavelength band into the first waveguide;
a second waveguide configured to conduct light of a second wavelength band from the light source, the second waveguide comprising a second input coupler configured to couple the light of the second wavelength band into the second waveguide; and
a diffractive filter positioned optically between an output coupler of the first waveguide and the second input coupler of the second waveguide, the diffractive filter being configured to diffract light of the first wavelength band transmitted through the first waveguide angularly away from an input coupling condition of the second input coupler prior to the light of the first wavelength band reaching the second input coupler, and the diffractive filter configured to transmit light of the second wavelength band.

2. The display system of claim 1, where the diffractive filter comprises a slanted grating.

3. The display system of claim 1, wherein the diffractive filter has a grating period configured to diffract blue light and transmit green light.

4. The display system of claim 1, wherein the diffractive filter has a grating period configured to diffract green light and transmit red light.

5. The display system of claim 1, where the display system comprises an augmented reality head mounted display.

6. The display system of claim 1, where the diffractive filter is spaced from one or more of the first waveguide and the second waveguide.

7. The display system of claim 1, where the diffractive filter is coupled to one or more of the first waveguide and the second waveguide via an adhesive.

8. The display system of claim 1, where the first diffractive filter is integrated with one or more of the first waveguide and the second waveguide.

9. A display system comprising:
a light source;
a first waveguide configured to conduct light of a first wavelength band from the light source, the first waveguide comprising a first input coupler configured to couple the light of the first wavelength band into the first waveguide;
a second waveguide configured to conduct light of a second wavelength band from the light source, the second waveguide comprising a second input coupler configured to couple the light of the second wavelength band into the second waveguide;
a third waveguide configured to conduct light of a third wavelength band from the light source, the third waveguide comprising a third input coupler configured to couple the light of the third wavelength band into the third waveguide;
a first diffractive filter positioned between a first output coupler of the first waveguide and the second input coupler of the second waveguide, the first diffractive filter configured to diffract light of the first wavelength band transmitted through the first waveguide angularly away from an input coupling condition for the second input coupler prior to the light of the first wavelength band reaching the second input coupler; and
a second diffractive filter positioned between a second output coupler of the second waveguide and the third input coupler of the third waveguide, the second diffractive filter configured to diffract light of the second wavelength band transmitted through the second waveguide angularly away from an input coupling condition for the third input coupler prior to the light of the second wavelength band reaching the third input coupler.

10. The display system of claim 9, wherein one or more of the first diffractive filter and the second diffractive filter comprises a slanted grating.

11. The display system of claim 9, wherein the first diffractive filter is configured to transmit green light and diffract blue light.

12. The display system of claim 11, wherein the second diffractive filter is configured to transmit red light and diffract green light.

13. The display system of claim 9, where the display system comprises an augmented reality head mounted display.

14. The display system of claim 9, where the first diffractive filter is spaced from one or more of the first waveguide and the second waveguide.

15. The display system of claim 9, where the first diffractive filter is coupled to the one or more of the first waveguide and the second waveguide via an adhesive.

16. In a display system, a method comprising:
- receiving light from a light source at an input coupler for a first waveguide;
- coupling light within a first wavelength band into the first waveguide while transmitting at least some uncoupled light within the first wavelength band through the first waveguide;
- receiving the uncoupled light within the first wavelength band at a diffractive filter positioned optically between an output coupler of the first waveguide and an input coupler for a second waveguide;
- diffracting at least a portion of the uncoupled light within the first wavelength band angularly away from an input coupling condition for the second waveguide prior to the light within the first wavelength band reaching the input coupler for the second waveguide, while transmitting light within a second wavelength band through the diffractive filter; and
- coupling light within the second wavelength band into the second waveguide.

* * * * *